United States Patent [19]
Chalupa

[11] Patent Number: 5,654,027
[45] Date of Patent: Aug. 5, 1997

[54] CONCENTRATED GELLAN GUM DISPERSION FOR USE IN FLUID GEL APPLICATIONS

[75] Inventor: William F. Chalupa, New York, N.Y.

[73] Assignee: Nutrasweet Company, Deerfield, Ill.

[21] Appl. No.: 472,023

[22] Filed: Jun. 6, 1995

[51] Int. Cl.⁶ ................................................. A23L 1/05
[52] U.S. Cl. .................... 426/573; 426/589; 426/590
[58] Field of Search ............................. 426/573–579, 426/658, 589, 590

[56] References Cited

U.S. PATENT DOCUMENTS

| | | | |
|---|---|---|---|
| 4,326,052 | 4/1982 | Kang et al. | 426/573 X |
| 4,326,053 | 4/1982 | Kang et al. | 426/573 X |
| 4,869,916 | 9/1989 | Clarke et al. | 426/573 |
| 4,876,105 | 10/1989 | Wolf et al. | 426/573 |
| 4,980,193 | 12/1990 | Tuason et al. | 426/654 |
| 5,190,778 | 3/1993 | Clare et al. | 426/329 |
| 5,196,220 | 3/1993 | Clare et al. | 426/329 |
| 5,273,767 | 12/1993 | Burgum | 426/240 |
| 5,376,396 | 12/1994 | Clarke et al. | 426/573 |
| 5,456,937 | 10/1995 | Chalupa | 426/573 |

*Primary Examiner*—Jeanette Hunter
*Attorney, Agent, or Firm*—Fitzpatrick, Cella, Harper & Scinto

[57] ABSTRACT

The present invention comprises a dual function suspension agent and texture modifier for use in beverages and other consumable fluids. The concentrated gum dispersion consists of a mixture of gellan gum, a sequestrant and optionally, a calcium salt. Preferably, the mix is used to prepare a unique gelled beverage in which flavors and other ingredients are uniformly distributed for excellent taste and mouthfeel.

17 Claims, No Drawings

CONCENTRATED GELLAN GUM DISPERSION FOR USE IN FLUID GEL APPLICATIONS

FIELD OF THE INVENTION

The present invention relates generally to food and beverage ingredients which modify the texture, flavor and/or mouthfeel and aesthetic appearance of those food or beverage applications. More specifically, the invention relates to a concentrated gum dispersion for the incorporation into fluidized food and beverage compositions so as to suspend certain flavor and/or texture ingredients and the like so as to present an aesthetically appealing fluidized gel.

BACKGROUND OF THE INVENTION

Many commercially available beverage and fluidized foods are unstable over a period of time and require stabilizing additives to maintain fluid homogeneity over an extended period of time. Citrus juices, for example, contain pulp material which remains suspended over a period of time only with the assistance of additives such as propylene glycol alginates or other food additives known to stabilize and/or thicken. Beverages containing powder additives such as cocoa powder also require suspending agents to prevent premature settling.

In the past, hydrocolloids such as gum arabic, xanthan gum, alginates, pectin, carrageenan, starch and modified starch, and carboxymethylcellulose have been used to stabilize beverages. Relatively large quantities of these materials are required in order to achieve an effective degree of stabilization. While stabilizing the beverage, these materials unfortunately affect beverage flavor and feel. Sometimes, as with xanthan gum, the beverage stabilizing material reacts with other beverage components, including proteins (such as milk proteins or beer proteins), affecting beverage flavor and stabilizer efficacy.

U.S. Pat. No. 4,980,193 to McGinley, et al., describes a stabilizing agent which contains colloidal microcrystalline cellulose, starch, and a non-thickening water soluble diluent such as maltodextrin, whey or non-fat dry milk which is useful as a rapid dispersing agent for suspending solids in an aqueous medium.

U.S. Pat. No. 5,376,396 to Clark discloses a beverage stabilizing system comprised of carboxymethyl cellulose and gellan gum in a weight ratio of from about 3:1 to about 20:1 respectively, and preferably 4:1. The blend is incorporated into beverages in amounts of from about 0.03 to about 0.06 weight percent. The blend composition allegedly creates a unique liquid gel structure which provides a system that suspends ingredients and components of beverages and other liquid consumables that would otherwise separate or settle to the bottom of the container.

None of the prior art suggests or discloses a dual function beverage modifier consisting of a concentrated gum dispersion that serves to both suspend and stabilize other particulate matter and flavors in the beverage as well as modify the mouthfeel thereof. Moreover, none of the prior art teaches a concentrated beverage additive which can modify the mouthfeel, taste and aesthetic appearance of fluidized consumables and beverages through the creation of a fluidized gel.

SUMMARY OF THE INVENTION

The present invention comprises a dual function suspension agent and texture modifier for use in beverages and other consumable fluids. The concentrated gum dispersion consists of a mixture of gellan gum, a sequestrant and optionally, a calcium salt. Preferably, the mix is used to prepare a unique gelled beverage in which flavors and other ingredients are uniformly distributed for excellent taste and mouthfeel.

DETAILED DESCRIPTION OF THE INVENTION

The dual function suspension agent and texture modifier of the present invention is in the form of a concentrated gellan gum dispersion consisting of gellan gum and a sequestrant. Optionally, and preferably, a calcium salt is also added to the blend which when incorporated in even minor amounts to beverages and other liquid consumables produces a fluid gel with enhanced mouthfeel and suspension properties with a very minor impact on the systems viscosity. Hence, none of the problems encountered in the prior art compositions resulting from the need to use large amounts of the stabilizing agent are encountered here.

Gellan gum is a heteropolysaccharide prepared by fermentation of the bacteria Pseudomonas elodea ATCC 31461. Gellan gum is available from Kelco Division of Monsanto Co., San Diego, Calif. under various names, including KELCOGEL, KELCOGEL PC, and KELCOGEL F. Processes for preparing gellan gum include those described in U.S. Pat. Nos. 4,326,052 and 4,326,053 to Kang which is hereby incorporated by reference. It is useful for a variety of gelling, texturizing, stabilizing and film forming applications, particularly as a gelling agent in foods, personal care products and industrial applications. Gellan gum can be used to prepare fluid gels which are pourable fluid masses with a very short flowable texture. By varying the gellan gum concentration, temperature, shear rate, ion types and levels, different textures and flow properties may be obtained.

A sequestrant is a compound that when added to a solution forms a coordination complex by certain phosphates with metallic ions so that the usual precipitation reactions with the latter are prevented. More generally, a sequestrant may be considered to be any compound that prevents an ion from exhibiting its usual properties through the close combination with an added material. In the food industry, sequestering agents are known to be useful aides in stabilizing color, flavor and texture ingredients.

The sequestering agents particularly useful in the practice of the present invention are sodium hexametaphosphate, sodium citrate, sodium tripolyphosphate, sodium tartrate and mixtures thereof. Preferably, sodium hexametaphosphate is used. The sequestrant is combined with the gellan gum to form a concentrated dispersion in a weight ratio range of from about 1:1 to about 1:2, respectively. Generally, the gellan gum will comprise from approximately 8% to about 40% by weight of the total weight of the composition. The sequestrant will comprise from about 8.0% to about 20% of the total weight of the dry mix composition, with water comprising the remainder to a total weight of 100%.

Optionally, and preferably, a calcium salt is also added to the mix. Suitable calcium salts useful in the practice of the present invention are characterized by the fact that they are insoluble in solutions at neutral pH and are soluble in solutions that possess an acidic pH. Particularly suitable calcium salts useful in the practice of the present invention comprise dicalcium phosphate dihydrate, calcium carbonate and mixtures thereof. The salt is added to the mixture in an amount of approximately 24% to about 40% by weight of the total weight of the concentrated texture modifier and suspension agent composition.

The texture modifier/suspension agent composition of the present invention is incorporated into beverages and other liquid consumables in relatively minor amounts of from only about 0.10% to about 3.0% by weight of the total weight of the liquid and preferably in an amount of from about 0.25% to about 2.0% by weight of the total liquid system. The resulting solution produces a product containing gellan gum and the sequestrant at levels sufficient to produce a fluid gel. The gel exhibits superior mouthfeel and suspension of particulate ingredients such as flavors, fruit components and the like, with a minimal impact on the systems viscosity. And as a minor benefit, the calcium salt provides an additional source of calcium ions for good health.

Without being bound to any theory, it is believed that the sequestration agent such as sodium hexametophosphate provides two functions in the fluid gel system not heretobefore realized. The high usage level of the sequestrant relative to the other components prevents hydration of the gellan gum as the initial mixture of the two is formed in water thereby allowing for a stabilized concentrated dispersion. When the texture modifier/suspension agent is then incorporated in a liquid and diluted to a proper concentration, hydration is achieved. This system also works well in liquids with an acidic pH in which hydration was always believed to be unachievable.

The following examples are provided in order to more specifically set forth embodiments of the present invention. They are for illustrative purposes only, however, and it is recognized that minor changes and alterations can be made that are not contemplated therein. To the extent that any such changes do not materially alter the final composition or the method for its preparation, these variations from the examples are to be understood as falling within the spirit and scope of the invention as recited by the claims that follow.

EXAMPLE 1

Ten concentrated texture modifier/suspension agent composition samples of the present invention were prepared in water in the following weight ratios:

| Sample | 1 | 2 | 3 | 4 | 5 |
|---|---|---|---|---|---|
| Gellan gum/ SHMP[1] | 2.5/1.0 | 2.5/1.5 | 2.5/2.0 | 1.0/1.0 | |
| Gellan gum/ Na Citrate | | | | | 2.5/1.0 |

| Sample | 6 | 7 | 8 | 9 | 10 |
|---|---|---|---|---|---|
| Gellan gum/ SHMP[1] | | | | | |
| Gellan gum/ Na Citrate | 5/1 | 5/1.5 | 2.5/2.0 | | |
| Gellan gum/ SHMP/ DCPD[2] | | | | 2.5/1.5/5.0 | |
| Gellan gum/ Na Citrate/ DCPD | | | | | 2.5/1.5/5.0 |

[1]sodium hexametaphosphate
[2]dicalcium phosphate dihydrate

Whereas all the samples were suitable concentrated dispersions, samples 2, 5, 9 and 10 did not hydrate at all when initially mixed in water whereas the others hydrated slightly. Regardless, with the exception of sample 1 which did in fact gel, none of the samples hydrated to the extent gellan gum would hydrate were it formulated by itself.

EXAMPLE 2

The benefits that of the present composition imparts to beverage and liquid consumables was shown by incorporating one (1) ml. of samples 9 and 10 in 96 grams of Mystic Iced Tea® to which three (3) grams of lemon flavored gellan beads were also added. The concentrated dispersions consisted of:

a) Gellan gum/sodium hexametaphosphate/dicalcium phosphate dehydrate in weight rations of 2.5/1.5/5.0, respectively and incorporated in weight percentage mounts of 2.5%, 1.5% and 5.0% of the total weight of the ice tea system.

b) Gellan gum/sodium citrate/dicalcium phosphate dehydrate in weight ratios 2.5/1.5/5.0, respectively and incorporated in weight percentages of 2.5%, 1.5%, and 5.0% of the total weight of the ice tea system.

The ice tea solution was preheated to 190° F. and the concentrated dry mix dispersions then added. The solution was cooled (stirring is optional) and a fluid gel was formed in which the lemon gellan beads were uniformly distributed throughout.

EXAMPLE 3

As illustrated by the following formulations, the gellan gum texture modifier/suspension agent produced in Example 1 is useful in a number of applications.

Herb Salad Dressing

| Ingredients | Grams | Percent |
|---|---|---|
| Water | 285.35 | 57.07 |
| Vinegar | 148.35 | 29.67 |
| Sugar | 49.40 | 9.88 |
| Salt | 9.90 | 1.98 |
| Mixed herbs | 5.00 | 1.00 |
| Gellan gum texture modifier suspension agent | 1.00 | 0.20 |
| Sodium citrate dihyd, fine granular | 1.35 | 0.27 |
| Sodium benzoate, powdered | 0.50 | 0.10 |
| Red Color (to suit) | — | — |
| | 500.00 g | 100 |

Combine the sugar, sodium benzoate, sodium citrate, gellan gum texture modifier/suspension agent and water. With mixing, heat to boiling and hold one minute. Add salt, followed by vinegar and herbs. Cool mixture to 32° C. (90° F.) while shearing. Pour into sterilized jars and seal. The salad dressing so produced was highly flavorful with a smooths. lubricious mouthfeel.

EXAMPLE 4

Strawberry Topping

| Ingredients | Grams | Percent |
|---|---|---|
| Strawberries | 200.00 | 40.00 |
| Water | 170.00 | 34.00 |
| Sugar, granular | 122.80 | 24.56 |
| Gellan gum composition | 3.35 | 0.67 |
| Citric acid, anhydrous, fine granular | 2.00 | 0.40 |
| Sodium citrate dihyd, fine granular | 1.35 | 0.27 |
| Sodium benzoate, powdered | 0.50 | 0.10 |
| Red Color (to suit) | — | — |
| | 500.00 g | 100 |

Combine strawberries and water. Mix dry ingredients, except citric acid, and stir into the strawberry mixture. Stir and heat strawberry mixture to boiling and hold for 1 minute. Stir in citric acid. Cool mixture to 32° C. (90° F.) while shearing. Pour into sterilized jars and seal. A smooth fruity strawberry topping is produced.

EXAMPLE 5

Sour Cream

| Ingredients | Grams | Percent |
| --- | --- | --- |
| Dairy cream, 40% butterfat | 930.00 | 46.50 |
| Milk, skim | 821.60 | 41.08 |
| Milk solids, non-fat | 152.30 | 7.62 |
| Emulsifier | 60.00 | 3.00 |
| Starter culture | 20.00 | 1.00 |
| Starch | 10.00 | 0.50 |
| Gellan gum composition | 4.00 | 0.20 |
| Salt | 2.00 | 0.10 |
| | 2000.00 g | 100.00 |

Combine the starch, salt, and milk solids. Separately add to the dairy cream and skim milk in a gallon stainless steel beaker. Place this container in a water bath on a hot plate. Stir mixture using a propeller-type stirrer during heating and cooling portions of this procedure. Add the emulsifier. Cover container with aluminum foil and heat the mixture to 85°–90° C. (185°–194° F.) for 30 minutes. Homogenize; single stage 175 kg/cm$^2$ (2500 psi). Cool while stirring to 32° C. (90° F.). Mixture will be partially gelled. Inoculate with the starter culture. Gently stir starter culture into the partially gelled mixture. Incubate at 22° C. (72° F.) for 14–16 hours or until acidity reaches pH 4.5. Shear the mixture using gentle agitation until mixture is smooth. Pour into containers. Cover and store at 40° C. (104° F.) for 24 hours. Sour cream is uniform in consistency and creamy.

I claim:

1. A texture modifier and suspension agent composition for use in beverages and other consumable fluids comprising a concentrated dispersion consisting of a sequestrant and gellan gum and optionally a calcium salt in water, wherein said sequestrant comprises from approximately 8% to about 20% by weight of the total composition and said gellan gum comprises from about 8% to about 40.0% by weight of the total composition.

2. The texture modifier/suspension agent composition of claim 1 further comprising a calcium salt.

3. The texture modifier/suspension agent composition of claim 2 wherein said sequestrant is selected from the group consisting of sodium hexametaphosphate, sodium citrate, and mixtures thereof.

4. The texture modifier/suspension agent composition of claim 3 wherein said calcium salt is characterized in that it is insoluble at neutral. pH and soluble at acidic pH.

5. The texture modifier/suspension agent composition of claim 4 wherein said calcium salt is selected from the group consisting of dicalcium phosphate dihydrate, calcium carbonate and mixtures thereof.

6. The texture modifier/suspension agent of claim 4 wherein, said neutral pH is about 7.0 and said acidic pH is below about 4.0.

7. The texture modifier/suspension agent composition of claim 2 wherein said calcium salt comprises from approximately 24% to about 40% by weight of the total weight of the composition.

8. A method for dispersing and suspending a flavor ingredient or texture component in a beverage or other consumable fluid to produce a fluid gel comprising:

preparing a concentrated dispersion consisting of gellan gum and a sequestrant, and optionally a calcium salt in water wherein said gellan gum comprises from about 8% to about 40.0% by weight of the total weight of the composition and said sequestrant comprises from about 8% to about 20% by weight of the total weight of the composition;

adding said dispersion to a beverage or consumable fluid which contains a flavor ingredient or texture component;

heating said beverage or fluid to facilitate hydration of the gellan gum component; and cooling said beverage or fluid to form said gel whereby said flavor ingredient or texture component is dispersed and suspended.

9. The method of claim 8 wherein said sequestrant is selected from the group consisting of sodium hexametaphosphate, sodium citrate, and mixtures thereof.

10. The method of claim 9 wherein said composition further comprises a calcium salt.

11. The method of claim 10 wherein said calcium salt is characterized in that it is insoluble at neutral pH and soluble at acidic pH.

12. The method of claim 11 wherein said calcium salt is selected from the group consisting of dicalcium phosphate dihydrate, calcium carbonate and mixtures thereof.

13. The method of claim 4 wherein said neutral pH is about 7.0 and said acidic pH is below about 4.0.

14. The method of claim 13 wherein said calcium salt comprises from approximately 24% to about 40% by weight of the total weight of the composition.

15. A beverage prepared with the texture modifier/suspension agent composition of claim 1.

16. A gravy prepared with the texture modifier/suspension agent of composition of claim 1.

17. A salad dressing prepared with the texture modifier/suspension of claim 1.

\* \* \* \* \*